(12) United States Patent
Castaneda et al.

(10) Patent No.: US 12,149,954 B2
(45) Date of Patent: Nov. 19, 2024

(54) DEVICE AND METHOD FOR ENHANCED PREEMPTION OF TRANSMISSIONS

(71) Applicant: HUAWEI TECHNOLOGIES CO., LTD., Shenzhen (CN)

(72) Inventors: Mario Castaneda, Munich (DE); Richard Stirling-Gallacher, Munich (DE); Xitao Gong, Munich (DE); Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 17/563,862

(22) Filed: Dec. 28, 2021

(65) Prior Publication Data

US 2022/0124515 A1 Apr. 21, 2022

Related U.S. Application Data

(63) Continuation of application No. PCT/EP2019/067411, filed on Jun. 28, 2019.

(51) Int. Cl.
*H04W 16/28* (2009.01)
*H04L 5/00* (2006.01)
*H04W 24/10* (2009.01)

(52) U.S. Cl.
CPC ........... *H04W 16/28* (2013.01); *H04L 5/0051* (2013.01); *H04W 24/10* (2013.01)

(58) Field of Classification Search
None
See application file for complete search history.

(56) References Cited

U.S. PATENT DOCUMENTS 11,864,160 B2 * 1/2024 Lee ................. H04W 74/0816
2015/0124071 A1 5/2015 Deline et al.
(Continued)

FOREIGN PATENT DOCUMENTS

| CN | 107666684 A | 2/2018 |
|---|---|---|
| CN | 108289065 A | 7/2018 |

(Continued)

OTHER PUBLICATIONS

Huawei, HiSilicon, "On pre-emption indication for DL multiplexing of URLLC and eMBB," 3GPP TSG RAN WG1 Meeting #89, Hangzhou, China, R1-1708124, total 10 pages, 3rd Generation Partnership Project, Valbonne, France (May 15-May 19, 2017).

(Continued)

*Primary Examiner* — Kodzovi Acolatse
(74) *Attorney, Agent, or Firm* — Leydig, Voit & Mayer, Ltd.

(57) ABSTRACT

A network device and UEs are provided, which support preemption of a transmission over a first link and provides to a first UE preemption information indicative of a first spatial filter that is to be preempted by the first UE for transmission over the first link. A second UE receives an indication from a network device to: perform a measurement of a reference signal on at least one second spatial filter, or transmit a reference signal on at least one second spatial filter; receive the reference signal from another UE and perform the measurement on the at least one second spatial filter, or transmit the reference signal to another UE on the at least one second spatial filter, according to the indication received from the network device; wherein the at least one second spatial filter is allocated by the UE for receiving over a second link.

14 Claims, 16 Drawing Sheets

(56) References Cited

U.S. PATENT DOCUMENTS

| | | | |
|---|---|---|---|
| 2018/0255532 | A1 | 9/2018 | Li et al. |
| 2019/0082426 | A1 | 3/2019 | Liou et al. |
| 2019/0222284 | A1* | 7/2019 | Huang .................. H04W 72/23 |
| 2019/0379506 | A1* | 12/2019 | Cheng .................. H04W 88/06 |
| 2020/0037343 | A1* | 1/2020 | He .................... H04W 28/0268 |
| 2020/0267713 | A1* | 8/2020 | Bagheri ............... H04L 5/0044 |
| 2020/0336253 | A1* | 10/2020 | He ........................ H04W 76/11 |
| 2020/0367278 | A1* | 11/2020 | Hosseini ............... H04W 76/27 |
| 2020/0395993 | A1* | 12/2020 | Ryu ...................... H04W 76/23 |
| 2021/0219268 | A1* | 7/2021 | Li .......................... H04W 72/20 |
| 2021/0306824 | A1* | 9/2021 | Li ........................... H04W 4/40 |
| 2021/0307023 | A1* | 9/2021 | He ...................... H04W 72/044 |
| 2021/0410129 | A1* | 12/2021 | Freda .................. H04W 72/543 |
| 2022/0104241 | A1* | 3/2022 | Zou ................... H04W 72/1268 |
| 2022/0174682 | A1* | 6/2022 | Li ...................... H04W 72/1263 |
| 2022/0201674 | A1* | 6/2022 | Bagheri ............... H04L 5/0044 |
| 2022/0210793 | A1* | 6/2022 | Behravan ............ H04W 12/106 |

FOREIGN PATENT DOCUMENTS

| | | |
|---|---|---|
| CN | 108401506 A | 8/2018 |
| CN | 109152040 A | 1/2019 |
| CN | 109842946 A | 6/2019 |

OTHER PUBLICATIONS

"An overview of D2D in 3GPP LTE standard," Technology, Retrieved from: https://www.slideshare.net/wiless/an-overview-of-d2d-in-3gpp-lte-standard, total 22 pages (Dec. 17, 2016).

Ericsson, "On Mode 2 Resource Allocation for NR Sidelink," 3GPP TSG-RAN WG1 Meeting #95, Spokane, WA, US, R1-1813641, total 16 pages, 3rd Generation Partnership Project, Valbonne, France (Nov. 12-16, 2018).

Noura et al., "A survey on interference management for Device-to-Device (D2D) communication and its challenges in 5G networks," Journal of Network and Computer Applications. vol. 71, pp. 130-150 (Apr. 2016).

ASUSTeK, "Discussion on preemption indication enhancement," 3GPP TSG RAN WG1 #96bis, Xi'an, China, R1-1905085, total 4 pages, 3rd Generation Partnership Project, Valbonne, France (Apr. 8-12, 2019).

Huawei, HiSilicon, "UL inter-UE transmission prioritization and multiplexing," 3GPP TSG RAN WG1 Meeting #94bis, Chengdu, China, R1-1810158, total 6 pages, 3rd Generation Partnership Project, Valbonne, France (Oct. 8-12, 2018).

Samsung, "Discussion on Unicast, Groupcast and Broadcast for NR V2X," 3GPP TSG RAN WG1 Meeting #94bis, Chengdu, China, R1-1810867, total 6 pages, 3rd Generation Partnership Project, Valbonne, France (Oct. 8-12, 2018).

Fujitsu, "Resource Allocation for NR V2X Sidelink Communication considering low latency requirement," 3GPP TSG RAN WG1 Meeting #94bis, Chengdu, China, R1-1810593, total 6 pages, 3rd Generation Partnership Project, Valbonne, France (Oct. 8-12, 2018).

NTT Docomo, Inc., "Sidelink resource allocation mechanism," 3GPP TSG RAN WG1 Meeting #94bis, Chengdu, China, R1-1811335, total 10 pages, 3rd Generation Partnership Project, Valbonne, France (Oct. 8-12, 2018).

Huawei, HiSilicon, "Link level evaluations on sidelink for NR V2X," 3GPP TSG RAN WG1 Meeting #94bis, Chengdu, China, R1-1810712, total 7 pages, 3rd Generation Partnership Project, Valbonne, France (Oct. 8-12, 2018).

* cited by examiner

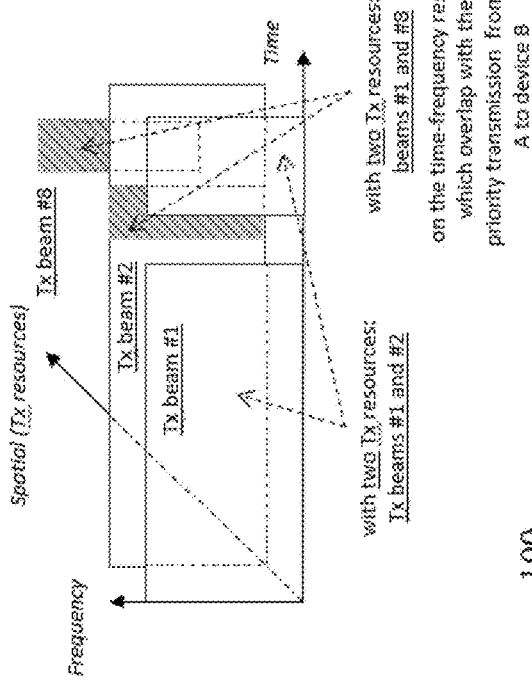
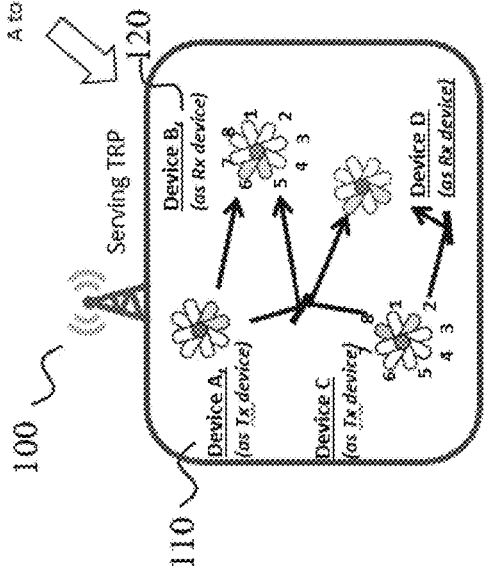
FIG. 3 a)
FIG. 3 b)

|  | Based on measurements made at | from a transmission of reference signals by | the spatial filters to be preempted by Device C, are determined at | with the network indicating |
|---|---|---|---|---|
| Method 1a | Device B, | Device C, |  |  |
| Method 1b | Device B, on the spatial filters used to receive the transmission from Device A | Device C, | the Network; (based on feedback to the network of measurements made at Device B) | the spatial filters of Device C to be preempted. |
| Method 1c | Device B, | Device C, on the spatial filters used to transmit to Device D; |  |  |
| Method 1d | Device B, on the spatial filters used to receive the transmission from Device A | Device C, on the spatial filters used to transmit to Device D; |  |  |
| Method 2a | Device C, | Device B |  | the spatial filters of Device B, which are to be associated with the spatial filters of Device C to be preempted. |
| Method 2b | Device C, on the spatial filters used to transmit to Device D | Device B | Device C; (Optional: based on feedback to network of measurements made at Device C) |  |
| Method 2c | Device C | Device B, on the spatial filters used to receive the transmission from Device A; |  | (Optional: threshold for determination of the spatial filters to be preempted) |
| Method 2d | Device C, on the spatial filters used to transmit to Device D | Device B, on the spatial filters used to receive the transmission from Device A; |  |  |

For the case of preemption of spatial filters via *Changing spatial filters*, the network indicates the filters to which the transmission should be switched to.

FIG. 8

1400
1401
Provide preemption information to a first UE, wherein the preemption information is indicative of at least one first spatial filter that is to be preempted by the first UE for the transmission over the first link
FIG. 14

1500

1501 — Obtain preemption information from a network device, wherein the preemption information is indicative of at least one spatial filter that is to be preempted by the UE for the transmission over the first link.

FIG. 15

DEVICE AND METHOD FOR ENHANCED PREEMPTION OF TRANSMISSIONS

CROSS-REFERENCE TO RELATED APPLICATIONS

This application is a continuation of International Application No. PCT/EP2019/067411, filed on Jun. 28, 2019, the disclosure of which is hereby incorporated by reference in its entirety.

TECHNICAL FIELD

Embodiments of the present disclosure relate to a multiplexing method, and in particular, to a transmissions multiplexing method for mitigating an interference of one transmission on another transmission. Embodiments of the present disclosure also provide a network device and user equipment (UE) both for supporting an enhanced preemption for multiplexing of transmissions.

BACKGROUND

Future communication networks, including new radio (NR) vehicle-to-everything (V2X), aim to support different V2X applications and transmissions with various latency and reliability requirements. A transmission may have higher priority due to higher reliability and/or lower latency requirements. For instance, such a transmission may include bursty/sporadic traffic requiring high reliability in V2X, or ultra-reliable and low-latency communication (URLLC). On the other hand, other type of transmissions, such as delay tolerant transmissions and enhanced mobile broadband (eMBB), may have lower priority. For an efficient spectrum usage for both high priority traffic and low priority traffic, transmissions with different priorities (including sidelink transmissions) can be scheduled on the same resources. However, multiplexing transmissions on shared resources may lead to interference, in particular interference from the low priority transmission on the high priority transmission.

eMBB and URLLC multiplexing have been considered in the uplink for intra-user equipment (UE) transmissions, and for inter-UE transmissions. In particular, two transmissions from the same UE can be multiplexed, and two transmissions from different UEs can be multiplexed as well. When multiplexing an URLLC transmission (high priority) with an eMBB transmission (low priority) on shared resources, the interference of an eMBB transmission on an URLLC transmission can be reduced via power control, i.e. by decreasing the transmit power of the eMBB transmission or by increasing the transmit power of the URLLC transmission. Interference from the eMBB transmission on the URLCC transmission can also be mitigated by preempting the eMBB transmission on indicated time-frequency resources, i.e. by pausing or canceling a scheduled eMBB transmission when an URLLC transmission occurs in overlapping time-frequency resources.

Current work on preemption-based schemes considers mainly preemption of downlink or uplink transmissions, but sidelink transmissions are not being considered. Furthermore, beam-based transmissions have not been taken into account by conventional preemption-based approaches. However, beamforming will be required in future communication networks including NR V2X, due to the propagation characteristics and corresponding path loss at higher frequencies.

Thus, an improved and enhanced preemption-based scheme, which also applies for sidelink transmissions, is desired.

SUMMARY

In view of the above-mentioned deficiencies, embodiments of the present invention aim to provide an enhanced preemption for multiplexing of UE transmissions. An objective is in particular to propose a preemption-based scheme, in which a lower priority transmission and a higher priority transmission on shared resources can both be in the sidelink. In addition, such a scheme is also to be applied for beam-based transmissions of the lower priority link and/or receptions of the higher priority link. This should be usable for multiplexing a higher priority transmission on the same resources as a lower priority transmission, such that the interference from the lower priority transmission on the higher priority transmission is mitigated.

An objective is achieved by the embodiment provided in the enclosed independent claims. Advantageous implementations of the embodiments of the present invention are further defined in the dependent claims.

A first aspect of the invention provides a network device for supporting preemption of a transmission over a first link, the network device being configured to: provide preemption information to a first user equipment (UE), wherein the preemption information is indicative of at least one first spatial filter that is to be preempted by the first UE for the transmission over the first link.

Particularly, the first link may be a low priority link, where there may be another high priority link in the same network with a higher priority. The terms "high priority" and "low priority" may be relative to another, i.e. in fact "higher priority" and "lower priority". Alternatively, the terms may be used absolutely, i.e. "high priority" may be above a certain threshold and/or "low priority" may be below a certain threshold, respectively. To mitigate an interference from the low priority link on the high priority link, the spatial filters used in the low priority link, which may cause the interference to the receive device in the high priority link, are to be preempted. The spatial filters to be preempted correspond to the spatial filters or transmit beams from the transmit device.

A spatial filter can refer to a beam. A spatial filter at the device, e.g. UE, may be formed by any kind of beam-forming method (i.e. digital, RF or hybrid beam-forming). Different spatial filters at the device may correspond to different beam directions from a single beam-forming array, panel or antenna element on the device, or from one or more beam-forming arrays, panels or antenna elements on the device. Furthermore, in some implementations, each beam-forming array, panel or antenna element on the device, could also form a single fixed spatial filter, i.e. a single fixed beam direction. A panel may be defined as a set of co-located antenna elements.

In an implementation form of the first aspect, the preemption information further indicates at least one further spatial filter to be used by the first UE for the transmission over the first link.

The preemption of a spatial filter can also be enabled by changing the spatial filter. That is, on one or more indicated time-frequency resources, the transmission with the indicated spatial filters is not performed, but it can be performed with other indicated spatial filters, e.g. transmission is switched to other transmit beams.

In an implementation form of the first aspect, the preemption information comprises at least one resource indicator of the first UE, wherein each of the at least one resource indicator identifies a resource (in the time-frequency grid) corresponding to each of the at least one first spatial filter to be preempted.

In particular, a spatial filter can be identified via a resource indicator, e.g. a channel state information reference signal (CSI-RS) resource indicator in the time-frequency grid, where a CSI-RS was transmitted by a UE with a spatial filter on the indicated time-frequency resource. For instance, the preemption information comprises a resource indicator X. Based on the preemption information, the first UE shall preempt the transmission with the spatial filter corresponding to the resource indicator X.

In an implementation form of the first aspect, the network device is configured to determine the preemption information based on a measurement performed by a second UE.

Optionally, the spatial filters to be preempted are determined by the network side. Particular it is determined based on measurements made at another device. The other device may be the receive device in the second link, i.e. in the high priority link, which is the potential victim of the interference.

In an implementation form of the first aspect, the network device is configured to determine the at least one resource indicator of the first UE based on the measurement performed by the second UE.

While the resource indicator identifies the resource corresponding to the spatial filter to be preempted, to determine the spatial filter to be preempted, the resource indicator of the first UE should be determined.

In an implementation form of the first aspect, the network device is configured to indicate the first UE to transmit a reference signal on at least one first spatial filter; and indicate the second UE to perform the measurement of the reference signal on at least one second spatial filter.

To obtain the measurement, the network device may indicate one or more UEs to perform a sounding procedure and a measurement. In particular, the sounding and measurements can be performed on the link from the first UE to the second UE. A sounding transmission of a UE refers to for example when the UE transmits reference signals, e.g. CSI-RS, with some spatial filters or transmit beams. Another UE may measure reference signals from the UE, and feed back to the network device. In particular, if the UE is configured to transmit reference signals with the spatial filters used to transmit the low priority transmission (first link), and the other UE is configured to make measurements with the spatial filters it uses for the reception of the high priority transmission (second link), a more precise determination of the potential interference impact can be achieved.

In an implementation form of the first aspect, the network device is configured to indicate a second UE to transmit a reference signal on at least one second spatial filter; and indicate the first UE to perform a measurement of the reference signal on at least one first spatial filter, wherein the preemption information indicates the first UE to preempt one or more of the at least one first spatial filter based on the measurement of the reference signal transmitted on one or more of the at least one second spatial filter.

Alternatively, the sounding and measurements can be performed on the link from the second UE to the first UE as well. Particularly, the spatial filters to be preempted are determined by the first UE, i.e. based on measurements made at the first UE. In this case, the second UE, the potential victim of the interference transmits reference signals, e.g. CSI-RS, with some spatial filters or transmit beams. And the first UE, the potential aggressor of the interference, makes the measurements with some spatial filters, i.e. with some receive beams.

In an implementation form of the first aspect, the at least one second spatial filter is allocated by the second UE for receiving over a second link.

That means, the second UE should transmit the reference signal or make measurements, in particular with the spatial filters used for the reception of the high priority transmission.

In an implementation form of the first aspect, the at least one first spatial filter is allocated by the first UE for transmitting over the first link.

Similarly, the first UE should transmit the reference signal or make measurements, particular with the spatial filters used for the transmission of the low priority transmission.

In an implementation form of the first aspect, the network device is configured to determine the one or more of the at least one second spatial filter based on a measurement performed by the first UE.

Based on the measurements at the first UE, it may identify the spatial filters (receive beams) on which it received a strong signal from the second UE, i.e. a reference signal a threshold. To avoid the network signaling the threshold, the first UE can feedback to the network the measurements of the reference signals sent by the second UE. Based on the feedback, the network determines which are the spatial filters of the second UE, i.e. the at least one second spatial filter, which are to be associated with the spatial filters of first UE to be preempted.

In an implementation form of the first aspect, the network device is configured to provide to the first UE information indicative of the one or more of the at least one second spatial filter of the second UE.

After the spatial filters of the second UE, i.e. the at least one second spatial filter, which are to be associated with the spatial filters of first UE to be preempted, is determined, the network device indicates these spatial filters of the second UE to the first UE.

In an implementation form of the first aspect, the preemption information comprises at least one resource indicator of the second UE.

While the resource indicator identifies the resource corresponding to the spatial filter, the resource indicator of the second UE should be provided.

A second aspect of the present invention provides a UE, for supporting preemption of a transmission over a first link, the UE being configured to obtain preemption information from a network device, wherein the preemption information is indicative of at least one first spatial filter that is to be preempted by the UE for the transmission over the first link.

Similar as the first aspect, the first link may be a low priority link. To mitigate an interference from the low priority link on the high priority link (a second link), the spatial filters used in the low priority link which may cause the interference to the receive device in the high priority link, need to be preempted.

In an implementation form of the second aspect, the UE is configured to preempt the at least one first spatial filter when transmitting over the first link.

Based on the preemption information received from the network device, the spatial filter used to transmit the low priority link (which may cause the interference), should be preempted by the UE.

In an implementation form of the second aspect, the preemption information comprises at least one resource indicator of the UE, wherein each of the at least one resource indicator identifies a resource corresponding to each of the at least one first spatial filter that is to be preempted.

While the resource indicator identifies the resource corresponding to the spatial filter to be preempted, the resource indicator of the UE should be provided.

In an implementation form of the second aspect, the UE is configured to receive an indication from the network device, indicating to transmit a reference signal on at least one first spatial filter; and transmit the reference signal on the at least one first spatial filter.

Optionally, in order to determine the spatial filter to be preempted, the UE may be instructed to perform a sounding transmission, particular, to transmit reference signals with some spatial filters.

In an implementation form of the second aspect, the UE is configured to: receive an indication from the network device to perform a measurement of a reference signal on at least one first spatial filter; receive the reference signal from another UE; and perform the measurement.

Alternatively, the UE may be instruct to perform the measurement on the reference signal from the other UE.

In an implementation form of the second aspect, wherein the at least one first spatial filter is allocated by the UE for transmitting over the first link.

In particular, the UE should transmit the reference signal or make the measurement, with the spatial filters used for the transmission of the low priority link.

In an implementation form of the second aspect, wherein the preemption information indicates the UE to preempt one or more of the at least one first spatial filter based on the measurement of the reference signal transmitted on at least one second spatial filter from the other UE.

Particularly, the spatial filters to be preempted are determined by the UE, i.e. based on measurements made at the UE.

In an implementation form of the second aspect, the UE is configured to receive information, indicative of the at least one second spatial filter used by the other UE to transmit the reference signal, from the network device.

After the spatial filters of the other UE, i.e. the at least one second spatial filter, which are to be associated with the spatial filters of the UE to be preempted, is determined, the network device indicates these spatial filters of the other UE to the UE.

In an implementation form of the second aspect, the UE is configured to indicate to the network device and/or to a receiving UE of the first link, information indicative of the at least one first spatial filter to be preempted.

Since the determination of the spatial filter to be preempted is performed at the UE side, the network device is not aware (yet) of the spatial filters of the UE to be preempted. Thus, after the UE has determined the spatial filters to be preempted, it signals the network device. Optionally, the UE may also signal a receiving UE of the first link, e.g. in the sidelink control information, the spatial filters which will be preempted.

In an implementation form of the second aspect, the preemption information further indicates at least one further spatial filter of the UE, and the UE is configured to: switch a transmission on the at least one first spatial filter to be preempted to the at least one further spatial filter when transmitting over the first link.

Instead of using the spatial filter which may cause the interference to the high priority link, the UE is instructed to use other spatial filters to transmit on the low priority link, which does not cause any interference on the high priority link.

A third aspect of the present invention provides a UE configured to: receive an indication from a network device to: perform a measurement of a reference signal on at least one second spatial filter, or transmit a reference signal on at least one second spatial filter; receive the reference signal from another UE and perform the measurement on the at least one second spatial filter, or transmit the reference signal to another UE on the at least one second spatial filter, according to the indication received from the network device; wherein the at least one second spatial filter is allocated by the UE for receiving over a second link.

The UE defined in the third aspect may be the same UE as "the second UE" defined in the first aspect, and "the other UE" defined in the second aspect. To support preemption of a transmission over a first link, the UE may be instructed to perform a sounding transmission or a measurement, particularly on the resource (at least one second spatial filter) used for the reception of a high priority transmission.

In an implementation form of the second aspect, the UE is configured to send the measurement of the reference signal to the network device.

If a spatial filter to be preempted is determined by the network device, the UE should feedback the measurements to the network device.

A fourth aspect of the present invention provides a method for supporting preemption of a transmission over a first link, the method comprising: providing preemption information to a first UE, wherein the preemption information is indicative of at least one first spatial filter that is to be preempted by the first UE for the transmission over the first link.

The method of the fourth aspect may have implementation forms that correspond to the implementation forms of the device of the first aspect. The method of the fourth aspect and its implementation forms provide the same advantages and effects as described above for the network device of the first aspect and its respective implementation forms.

A fifth aspect of the present invention provides a method for a UE for supporting preemption of a transmission over a first link, the method comprising: obtaining preemption information from a network device, wherein the preemption information is indicative of at least one spatial filter that is to be preempted by the UE for the transmission over the first link.

The method of the fifth aspect may have implementation forms that correspond to the implementation forms of the device of the second aspect. The method of the fifth aspect and its implementation forms provide the same advantages and effects as described above for the UE of the second aspect and its respective implementation forms.

A sixth aspect of the present invention provides a method for a UE for supporting preemption of a transmission over a first link, the method comprising: receiving an indication from a network device to: perform a measurement of a reference signal on at least one second spatial filter, or transmit a reference signal on at least one second spatial filter; receiving the reference signal from another UE and performing the measurement on the at least one second spatial filter, or transmitting the reference signal to another UE on the at least one second spatial filter, according to the indication received from the network device, wherein the at least one second spatial filter is allocated by the UE for receiving over a second link.

The method of the sixth aspect may have implementation forms that correspond to the implementation forms of the device of the third aspect. The method of the sixth aspect and its implementation forms provide the same advantages and effects as described above for the UE of the third aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which

FIG. 3 a) shows a data preemption scenario according to an embodiment of the invention.

FIG. 3 b) shows a changing spatial filter scenario according to an embodiment of the invention.

FIG. 8 shows a comparison of variants of Method 1 and Method 2 according to embodiments of the present invention.

FIG. 14 shows a schematic block flowchart of a method for supporting preemption of a transmission over a low priority link according to an embodiment of the present invention.

FIG. 15 shows a schematic block flowchart of another method for supporting preemption of a transmission over a low priority link according to an embodiment of the present invention.

DETAILED DESCRIPTION OF EMBODIMENTS

Figure 1:
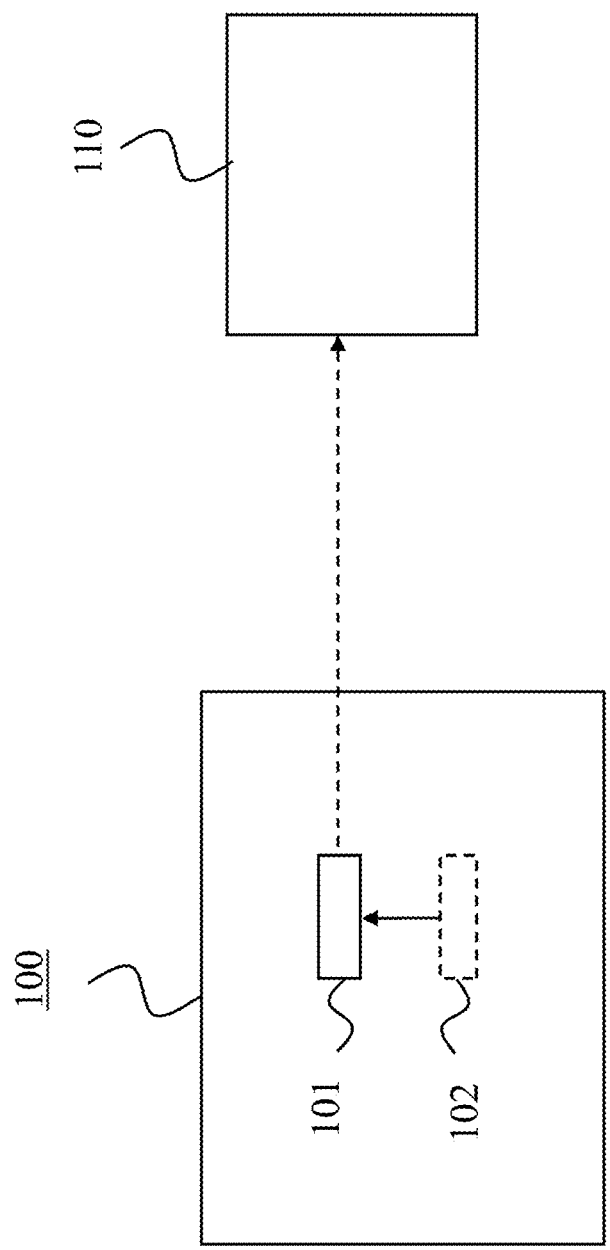
FIG. 1 shows a network device according to an embodiment of the invention.

FIG. 1 shows a network device 100 for supporting preemption of a transmission over a first link according to an embodiment of the invention. The network device 100 may comprise processing circuitry (not shown) configured to perform, conduct or initiate the various operations of the network device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the network device 100 to perform, conduct or initiate the operations or methods described herein.

In particular, the network device 100 is configured to provide preemption information 101 to a first UE 110. The preemption information 101 is indicative of at least one first spatial filter 102 that is to be preempted by the first UE 110 for the transmission over the first link.

The network device 100 may be a transmit-receive point (TRP). Examples of the TRP include an access node, evolved NodeB (eNB), next generation NodeB (gNB), base station (BS), NodeB, master eNB (MeNB), secondary eNB (SeNB), remote radio head, access point, user equipment (UEs), master UE, mobile, mobile station, terminal, and the like. The first UE 110 may be a device in a coverage of the network device 100. In particular, the first UE 100 is evolved in a first transmission link. The first link may be a low priority link. That means, the first link has a lower priority than another link, e.g. a second link, which could be a high priority link.

A spatial filter represents a spatial filter or transmit beam of a UE, i.e. a time and frequency resource. A preemption of spatial filters of the UE's transmission, in particular on a sidelink, is considered, such that the UE's transmission does not cause interference on another transmission. This allows multiplexing a high priority transmission of a UE (either in the sidelink or uplink) on resources of a low priority transmission, such that the interference from the low priority link on the high priority link is mitigated. The spatial filters to be preempted correspond for example to transmit beams from a transmit device in the low priority link, which may cause interference to a receive device in the high priority link.

The preemption of spatial filters can be enabled in two ways: data preemption, or changing the spatial filters. In particular, data preemption means that a transmission on indicated time-frequency resources is paused. Alternatively, the transmission with indicated spatial filters is not performed on indicated time-frequency resources, but it is performed with other available spatial filters. In the second scenario, the transmission may be switched to other transmit beams.

The preemption of spatial filters, via data preemption or changing spatial filters, can be performed with a fine resource granularity, e.g. code block (CB)/code block group (CBG) based preemption instead of transport block (TB) based preemption.

Optionally, the preemption information 101 may comprise at least one resource indicator of the first UE 110. Each of the at least one resource indicator identifies a resource (in the time-frequency grid) corresponding to one of the at least one first spatial filter 102 to be preempted. For instance, the resource indicator may be a CSI-RS resource indicator, where a CSI-RS was transmitted by the first UE with a spatial filter on the indicated time-frequency resource.

Figure 2:
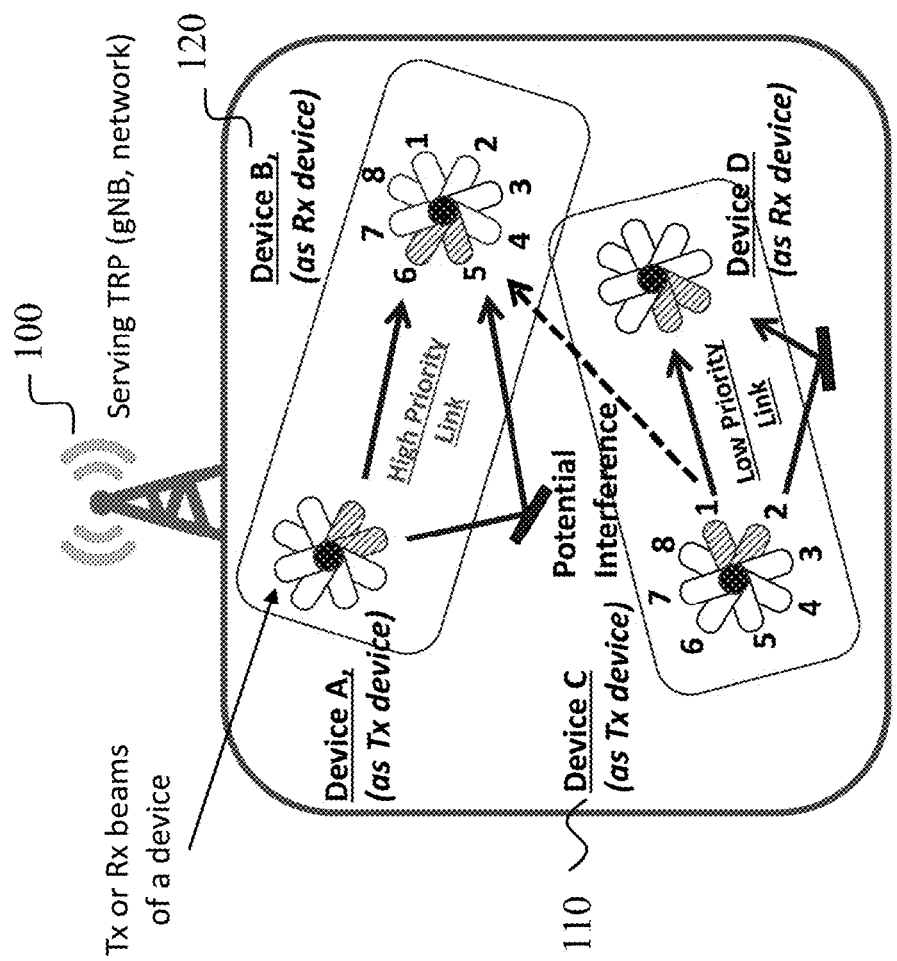
FIG. 2 shows devices in coverage of a network according to an embodiment of the invention.

A network scenario according to an embodiment of the invention, comprises a serving TRP, and device A, device B, device C and device D which are in coverage of the serving TRP, as depicted in FIG. 2. These devices can be transmit and/or receive devices. Device C and device D are involved in a low priority link, whereas device A and device B are involved in a high priority link. For instance, device C is a UE, whereas the other devices can be a UE or a TRP (gNB). In such case, the high priority link can be a sidelink, uplink or downlink. The low priority link can be a sidelink or uplink. In the case where all the devices are UEs in coverage of a serving TRP and hence, both links are sidelinks. Device C is scheduled to transmit to device D (low priority transmission) with certain spatial filters (e.g. transmit beams) on some time-frequency resources.

According to the embodiment depicted in FIG. 2, device C is configured to transmit to device D with the spatial filters corresponding to transmit beams #1 and #2 of device C. Device C may be the first UE 110 in FIG. 1. The link between device C and device D is the first link. The serving TRP may be the network device 100 in FIG. 1. The serving TRP wants to schedule a high priority transmission from device A to device B on some time-frequency resources which overlap with the time-frequency resources of the low priority transmission. To avoid potential interference from the low priority transmission (i.e. from device C), on the high priority transmission (i.e. at device B), the serving TRP (i.e. the network device 100) can indicate to device C the spatial filters that should be preempted, which correspond to the spatial filters that may cause potential interference at device B.

In the embodiment as depicted in FIG. 2, the spatial filter to be preempted would correspond to transmit beam #1 of device C. In case of data preemption, the low priority transmission with transmit beam #1 of device C should be paused on the time-frequency resources where the high priority transmission overlaps with the low priority transmission as shown in FIG. 3a. In case of changing the spatial filters, the low priority transmission with transmit beam #1 of device C is switched to another transmit beam, e.g. to transmit beam #8, on the time-frequency resources where the high priority transmission overlaps with the low priority transmission as shown in FIG. 3b. It is assumed that transmit beam #8 of device C can be used to reach device D and it does not cause interference on the high priority transmission.

The advantage of the proposed preemption of spatial filters according to an embodiment of the invention, is that the high priority transmission can be multiplexed with the low priority transmission, without completely pausing the low priority transmission on the overlapping resources, while also mitigating the interference from the low priority transmission on the high priority transmission.

Embodiments of the invention includes the following parts: the determination and indication to the low priority link of the spatial filters to be preempted, and the configuration of a device to make measurements on certain spatial filters. Several methods are proposed for these two points, which are discussed in the following. For ease of explanation, the setup described in FIG. 2 is considered, with the low priority transmission consisting of a transmission of device C (low priority transmit device) to device D (low priority receive device) and the high priority transmission consisting of a transmission of device A (high priority transmit device) to device B (high priority receive device). In particular, device C in FIG. 2, which is also the first UE in FIG. 1, is considered as the potential aggressor of interference. Device B is considered as the potential victim of interference.

Figure 4:
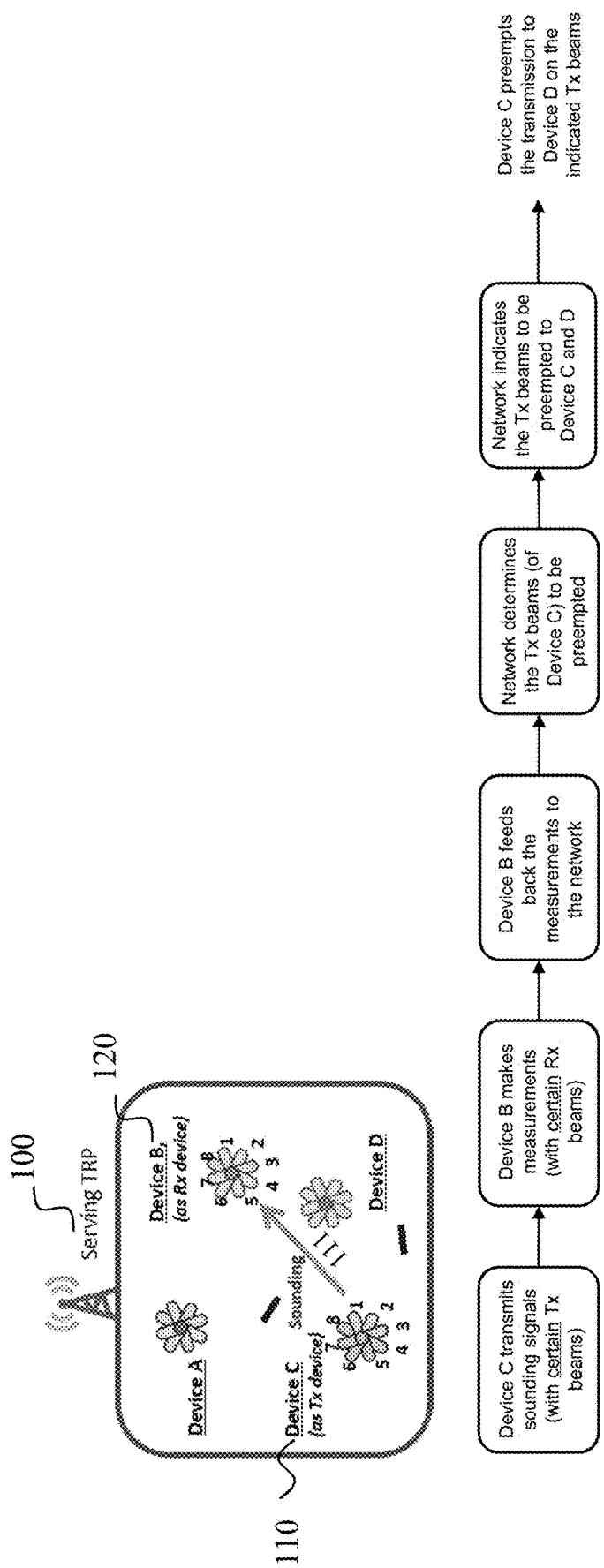
FIG. 4 shows Method 1 of determining and indicating the spatial filters to be preempted according to an embodiment of the present invention.

FIG. 4 shows a proposed Method 1, according to embodiments of this invention. For Method 1, the spatial filters (Tx beams) to be preempted are determined by the network, namely the network device 100 in FIG. 1, based on measurements made at device B (potential victim) of a sounding transmission of device C (potential aggressor) as shown in FIG. 4. That means, the network device 100, according to an embodiment of the invention, may be configured to determine the preemption information 101 based on a measurement performed by a second UE 120. Device B in FIG. 2-4 may be the second UE 120. In particular, as the preemption information 101 may comprise at least one resource indicator of the first UE 110, the network device 100 may be further configured to determine the at least one resource indicator of the first UE 110 based on the measurement performed by the second UE 120.

The sounding transmission of device C refers to for example when device C transmits reference signals, e.g. CSI-RS, with some spatial filters or transmit beams. The measurements can be obtained at the serving TRP, i.e. network device 100, based on feedback from device B, i.e. the second UE 120. The feedback can consist of the spatial filters, i.e. the reference signals sent with transmit beams, from device C on which device B measured the strongest (potentially interfering) signal from device C, along with a measure of the channel quality received with those spatial filters. As in 5G NR, the feedback may not include information about which receive beam or spatial filter is used by device B to receive a reference signal from device C. Thus, to get more precise information of the interference impact for determining the spatial filters of device C to be preempted, device C can be configured to transmit reference signals on specific spatial filters, i.e. transmit beams, and/or device B can be configured to make measurements on specific spatial filters, i.e. receive beams. Further, device B can be configured to make measurements on spatial filters, i.e. receive beams, used to receive a reference signal from specified spatial filters of device A (e.g. spatial filters which are quasi co-located (QCL-ed) with spatial filters of device A).

Thus, the network device 100 may be configured to indicate the first UE 110 to transmit a reference signal 111 on at least one first spatial filter, as shown in FIG. 4. Optionally, the network device 100 may be configured to indicate the second UE 120 to perform the measurement of the reference signal 111 on at least one second spatial filter. It should be noted that, the at least one first spatial filter 102 to be preempted, which is indicated by the preemption information 101, may be a subset of the at least one first spatial filter on which the first UE 110 transmits the reference signal 111.

According to the embodiment shown in FIG. 2, device B can be configured to make measurements with receive beams #5 and #6, which would be used for receiving the high priority transmission from device A. This measurement configuration provides the advantage that the obtained measurements characterize better the potential interference that device B can experience when receiving a transmission from device A (high priority transmission). In addition, with this measurement configuration, device B does not need to feed back information about the receive beams used for the measurements.

Furthermore, device C can be configured to transmit a reference signal on spatial filters, i.e. transmit beams, used to transmit to device D. According to the embodiment shown in FIG. 2, device C can be configured to transmit the reference signals with transmit beams #1 and #2, which are used for transmitting the low priority transmission to device D. This transmission configuration provides the advantage that the obtained measurements characterize better the potential interference that device B can experience from device C, when device C is transmitting to device D (low priority transmission).

Based on the feedback of measurements of device B, the spatial filters of device C to be preempted can be determined at the network, e.g. as the spatial filters for which the measurements are above a threshold, i.e. which may cause interference at device B. In the embodiment shown in FIG. 4, the spatial filter of device C to be preempted corresponds to transmit beam #1 of device C, as the transmission with this transmit beam would cause interference at device B, when device B is receiving a transmission from device A. After the spatial filters to be preempted are determined at the network side, they are signaled to the devices in the low priority link, i.e. device C and device D in the embodiment depicted in FIG. 2, such that afterwards the transmission of the low priority link on the signaled spatial filters is preempted (on indicated time-frequency resources).

The preemption of the spatial filters can be performed by data preemption or by changing the spatial filters. For both options with Method 1, the spatial filters to be preempted are determined at the network side and signaled to the devices in the low priority link. In addition, for the option of changing the spatial filters, the network determines the spatial filters of device C, to which the transmission on the spatial filters of device C to be preempted, should be switched to. This can be determined for example based on previous feedback of measurements at device D from reference signals transmitted by device C. The spatial filters which should be used instead of the spatial filters to be preempted (on indicated time-frequency resources), should also be signaled to the devices in the low priority link. A flowchart summarizing Method 1 for both data preemption and changing the spatial filters is provided in FIG. 5, where the additional steps for changing the spatial filters are indicated as optional.

Figure 5:
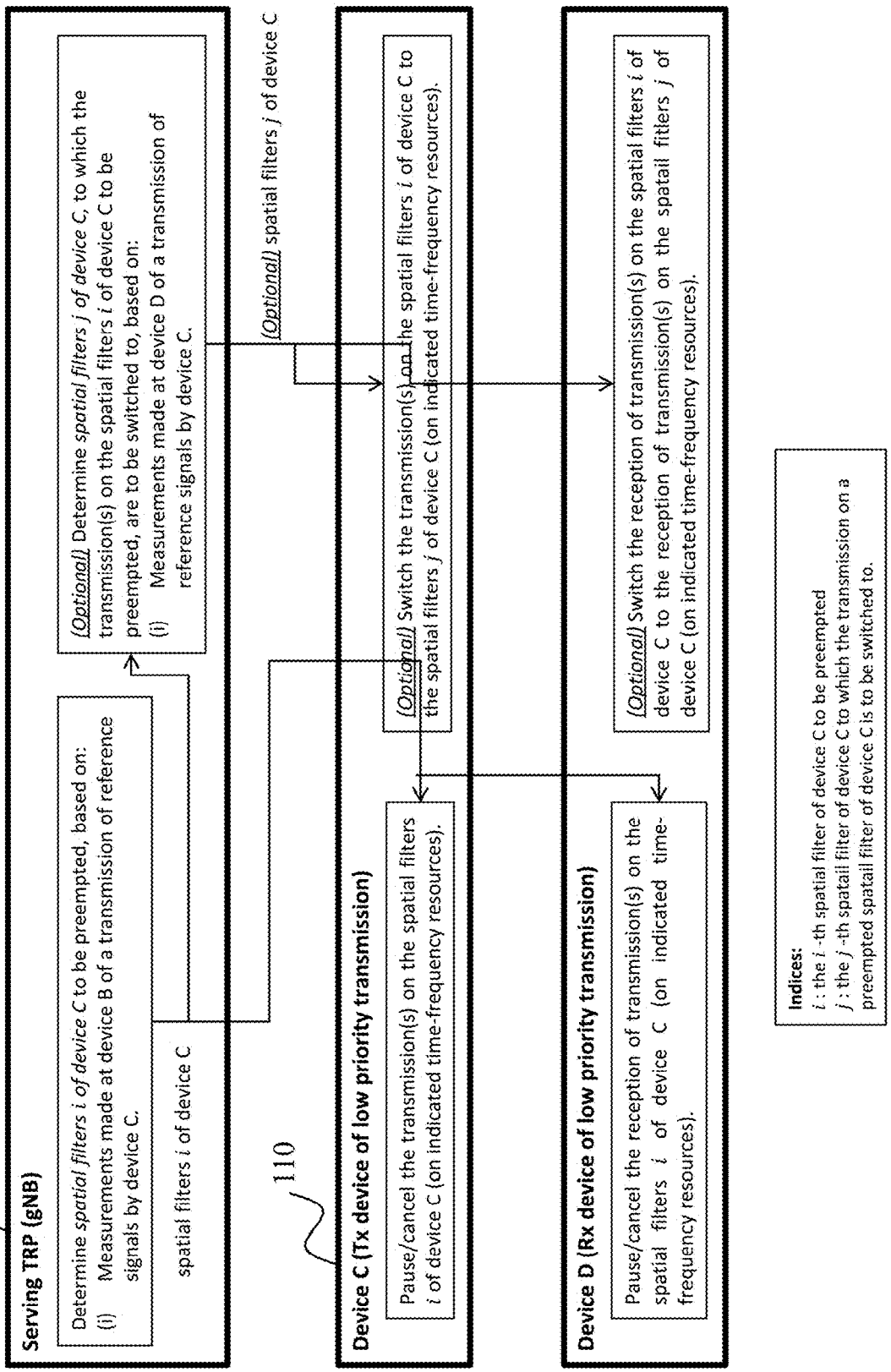
FIG. 5 shows a flowchart summarizing Method 1 for both data preemption and changing the spatial filters according to an embodiment of the present invention.
Figure 6:
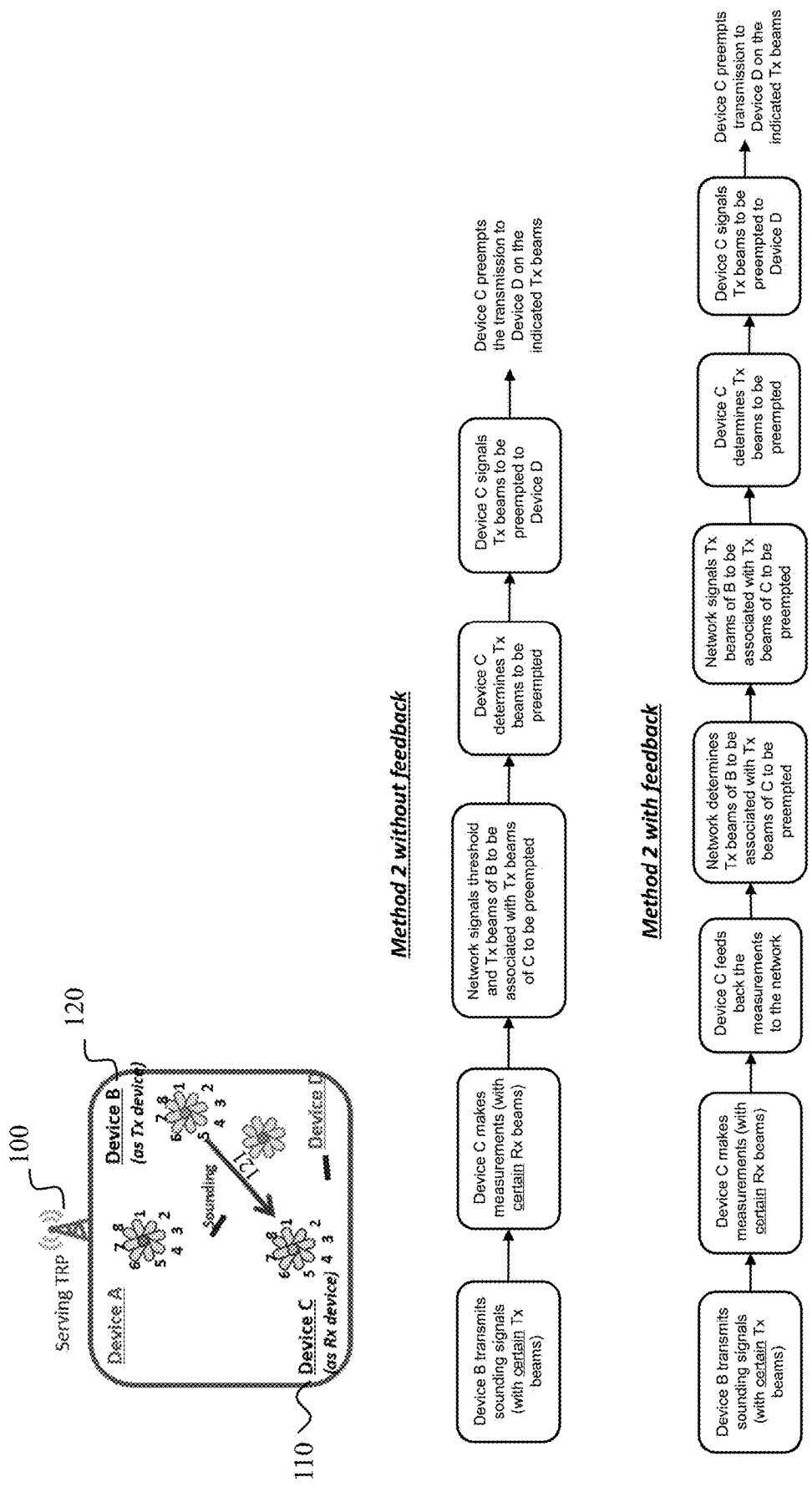
FIG. 6 shows Method 2 (with/without feedback) of determining and indicating the spatial filters to be preempted according to an embodiment of the present invention.

FIG. 6 depicts an alternative Method 2 according to an embodiment of this invention. For Method 2, the spatial filters to be preempted are determined by device C, i.e. based on measurements made at device C (potential aggressor) of a sounding transmission of device B (potential victim) as shown in FIG. 6. Device C shown in FIG. 6 is the same device C as shown in FIG. 2-5, namely, the first UE 110 shown in FIG. 1. Device B shown in FIG. 6 is the same device B as shown in FIG. 2-4, that is, the second UE 120.

It should be noted that for Method 2, the sounding transmission is performed on the reverse link of the link which is considered for Method 1. In particular, device B, namely the second UE 120, transmits reference signals, e.g. CSI-RS, with some spatial filters, i.e. with some spatial filters or transmit beams. And device C, namely the first UE 110, makes the measurements with some spatial filters, i.e. with some receive beams. Based on the measurements at device C, device C identifies the spatial filters (i.e. receive beams) on which it received a strong signal from device B, i.e. a reference signal from device B above a threshold. The spatial filters to be preempted correspond to the spatial filters (transmit beams) which are associated with these spatial filters (receive beams), as the transmission on these spatial filters may cause interference at device B (due to reciprocity). In the embodiment depicted in FIG. 6, device C identifies the spatial filters (i.e. receive beams) on which it received a signal from device B, e.g. a signal from device B above a threshold. As device C receives the strongest signal from device B with receive beam #1, the spatial filter to be preempted by device C corresponds to transmit beam #1, as the transmission on this spatial filters may cause interference at Device B (due to reciprocity). The network TRP, can assist device C by providing a threshold as well as by indicating the measurements of which spatial filters of device B are to be considered for determining the spatial filters to be preempted. The TRP is the network device 100 as shown in FIG. 1-5.

Hence, the network device 100 as shown in FIG. 6, according to an embodiment of the invention, may be configured to indicate the second UE 120 to transmit a reference signal 121 on at least one second spatial filter. The network device 100, according to an embodiment of the invention, may be further configured to indicate the first UE 110 to perform a measurement of the reference signal 121 on at least one first spatial filter. Optionally, the preemption information 101 indicates the first UE 110 to preempt one or more of the at least one first spatial filter 102 based on the measurement of the reference signal 121 transmitted on one or more of the at least one second spatial filter 103. It should be noted that, the one or more of the at least one second spatial filter 103, may be a subset of the at least one second spatial filter on which the second UE 120 transmits the reference signal 121.

In contrast to Method 1, where the spatial filters to be preempted are determined at the network device 100, in Method 2, the network device 100 indicates implicitly the spatial filters of the first UE 110 (device C) to be preempted based on spatial filters of the second UE 120 (device B).

For the determination of the spatial filters to be preempted at device C, feedback of the measurements from device C may not be required. On the other hand, to avoid the network signaling the threshold, device C can feedback to the network the measurements of the reference signals sent by device B. Based on the feedback, the network determines which are the spatial filters of device B that are to be associated with the spatial filters of device C to be preempted, i.e. the spatial filters of device B which have a measured channel quality above a threshold.

That means, the network device 100 may be configured to determine the one or more of the at least one second spatial filter 103 based on the measurement performed by the first UE 110. Optionally, the network device 100 may be further configured to provide to the first UE 110 information indicative of the one or more of the at least one second spatial filter 103 of the second UE 120.

Afterwards, the network indicates these spatial filters of device B to device C. Based on the measurements, device C then determines the spatial filters to be preempted, corresponding to the spatial filters on which device C received a reference signal (e.g. above a threshold) from the spatial filters of device B indicated by the network. The feedback of the measurements at device C from the transmission of device B provides the advantage that the network does not need to signal the threshold to device C for the determination of the spatial filters to be preempted. However, the network is not aware (yet) of the spatial filters of device C to be preempted since the determination of the spatial filter to be preempted is performed at device C. After device C has determined the spatial filters to be preempted, with or without feedback, device C signals them, e.g. in the sidelink control information, to the receive device in the low priority link, i.e. device D as shown in FIG. 2-6. This provides the advantage that the receive device of the low priority link is aware of the spatial filters which will be preempted. The spatial filters to be preempted can also be signaled to the network device 100, since the network device 100 is not aware of which spatial filters of device C would be preempted. Afterwards, the transmission of the low priority link on the spatial filters determined at device C is preempted (on indicated time-frequency resources).

A summary of Method 2, with and without feedback, is shown in FIG. 6. For Method 2, to get a more precise information of the interference impact for determining the spatial filters to be preempted, device B can be configured to transmit a reference signals (sounding) on certain spatial filters, i.e. transmit beams, and/or device C can be configured to make measurements on certain spatial filters, i.e. receive beams. For example, device C can be configured to make measurements on spatial filters, i.e. receive beams, which correspond to specified spatial filters of device C, e.g. spatial filters used to transmit to device B.

For instance, as shown in FIG. 6, device C can be configured to make measurements with beams #1 and #2, which correspond to the spatial filters which would be used for transmitting the low priority transmission to device D. This measurement configuration provides the advantage that the obtained measurements characterize better the potential interference that device C can cause to device B, when device C is transmitting to device D (low priority transmission). Furthermore, device B can be configured to transmit a reference signal on spatial filters, i.e. transmit beams, which correspond to spatial filters used to receive a transmission from device A. Particularly, as shown in FIG. 6, device B can be configured to transmit reference signals with beams #5 and #6, which correspond to the beams used to receive the high priority transmission from device A. This transmission configuration provides the advantage that the measurements obtained at device C characterize better the potential interference that device B can experience when receiving a transmission from device A (high priority transmission).

The preemption of the spatial filters can be performed by data preemption or by changing the spatial filters. For both options with Method 2, the spatial filters to be preempted are determined by the transmit device in the low priority link, with assistance of the network device, and signaled to the receive devices in the low priority link. In addition, for the option of changing the spatial filters, the network device determines the spatial filters of device C, to which the transmission on the spatial filters of device C to be preempted, should be switched to. These spatial filters, which should be used instead of the spatial filters to be preempted (on indicated time-frequency resources), should be signaled to the devices in the low priority link. A flowchart summarizing Method 2 for both data preemption and changing the spatial filters is given in FIG. 7, where the additional steps for changing the spatial filters are indicated as optional. Furthermore, the use of the threshold at device C for determining the spatial filters to be preempted is also indicated as optional, in case there is no feedback from device C to the network device.

Notably, Method 1 is a network-based determination of spatial filters to be preempted, while Method 2 is a network-assisted UE-based determination of spatial filters to be preempted. Whereas Method 1 is based on sounding and measurements on the link from device C to device B, Method 2 is based on sounding and measurements on the link from device B to device C. Method 2 provides the advantage that the reciprocity of the links can be exploited.

In addition, for both methods, the beams of device C, namely the at least one first spatial filter of the first UE 110, which is used to either transmit the reference signal or perform the measurement, is allocated by the first UE 110 for transmitting over the first link. Similarly, the beams of device B, i.e. the at least one second spatial filter of the second UE 120, that is used to either transmit the reference signal or perform the measurement, is allocated by the second UE 120 for receiving over the second link. Optionally, the preemption information 101 may also comprise at least one resource indicator of the second UE 120.

Further, it should be noted that for obtaining the measurements to enable Method 1 and Method 2, the required sounding and measurements may already be available when performing the required sounding for setting up the beam pair links for the low priority link and for the high priority link. In particular, when a device is sounding its transmit beams (beam sweeping), other devices not involved in the given link can be configured to make measurements. For example, the measurements required for Method 1 can be obtained at device B, when device C is transmitting a sounding signal to device D. In addition, for Method 1, device B feeds back the measurements to the network. Similarly, the measurements for Method 2 can be obtained at device C, when device B is sending a sounding signal to device A, i.e. on the reverse link from device A to device B, which can serve as the control (feedback) link for the link from device A to device B. In addition, for Method 2, device C can feed back the measurements to the network. However, Method 2 can be enabled without feedback as well.

Furthermore, embodiments provided in this invention support different beamforming capabilities of the devices, e.g. all involved devices have no beamforming capabilities (omni-directional), device B has no beamforming capabilities (omni-directional), device C has no beamforming capabilities (omni-directional), or all involved devices have beamforming capabilities, etc.

The proposed methods have been discussed for multiplexing inter-UE transmissions. But it should be noted that these methods are also applicable to the case of multiplexing intra-UE transmissions. For intra-UE multiplexing, device A and device C may be on the same device, such that the high priority link is from device A/C to device B, whereas the low priority link is from device A/C to device D. Device A/C may know, whether the low priority transmission may cause interference to the high priority transmission.

In addition, embodiments of the invention also supports the case when the low priority transmission is a groupcast transmission, i.e. a device C transmitting to multiple receive devices. In this case, the spatial filters to be preempted is signaled to all the receive devices in the low priority group cast transmission. The proposed methods also support the case when the high priority transmission is a groupcast transmission, i.e. device A is transmitting to multiple receive devices.

Moreover, the proposed methods can support the case of multiplexing two or more transmissions with different priorities, such that a higher priority transmission is protected from interference from lower priority transmissions. The high priority transmission may consist of a latency-critical transmission/re-transmission, an urgent scheduling request, or an urgent acknowledgement/negative acknowledgement (ACK/NACK) feedback.

The spatial filters may come from different transmit panels, different transmit ports or from the same transmit panel. The proposed approach is also applicable when device D and device B are on the same device.

Figure 7:
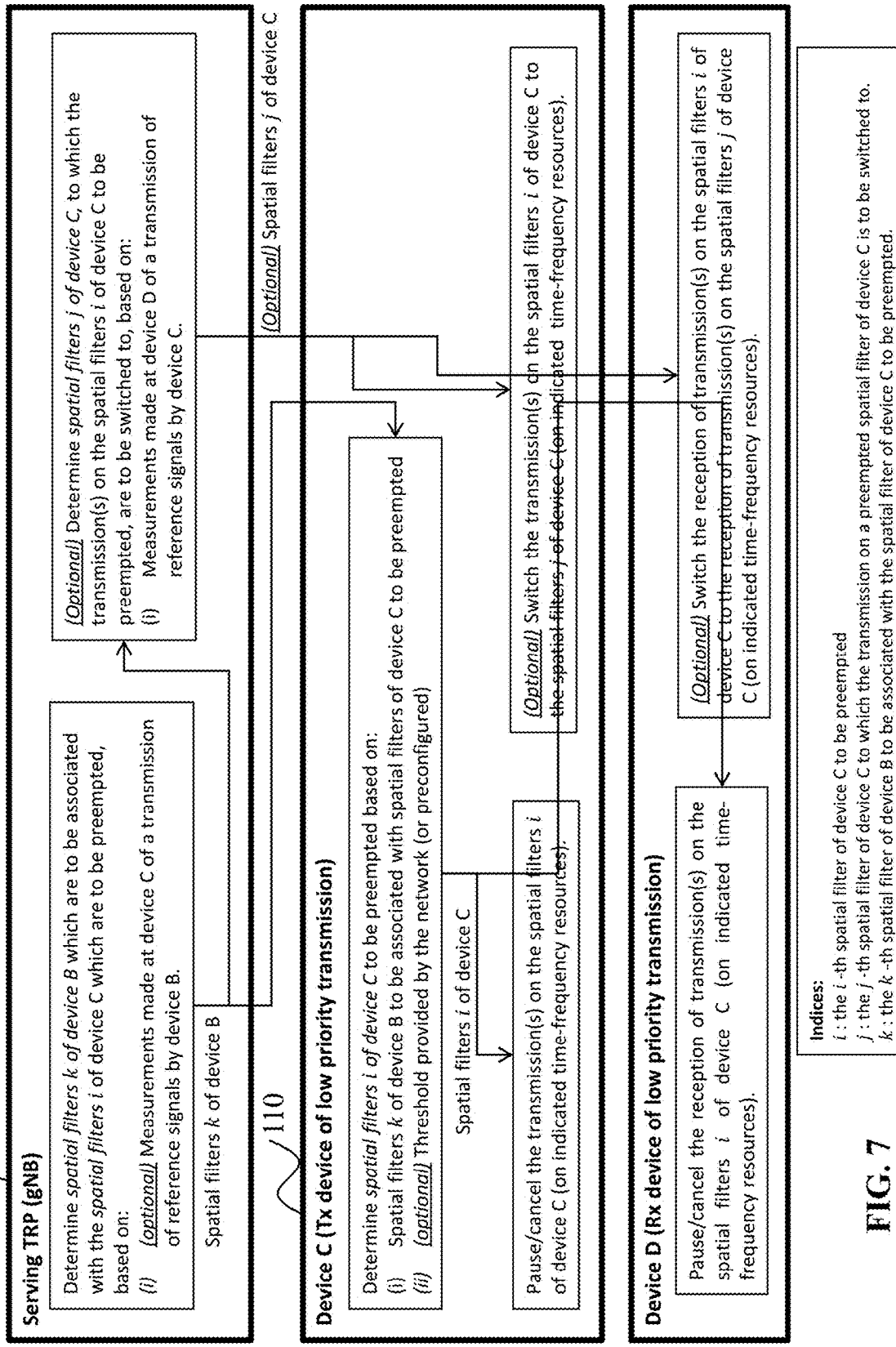
FIG. 7 shows a flowchart summarizing Method 2 for both data preemption and changing the spatial filters according to an embodiment of the present invention.

In the following embodiments, the case that the spatial filter preemption is enabled via data preemption will be discussed. Spatial filter preemption via changing spatial filters is enabled as spatial filter preemption with data preemption, along with an additional indication from the network of the spatial filters which should be used instead of the preempted spatial filters, as shown in FIG. 5 and FIG. 7.

As discussed before, certain spatial filters or transmit beams can be used by device C for transmitting the reference signals. And certain receive spatial filters or receive beams can be used by device B to make the measurements for Method 1. Depending on which spatial filters are used for sounding by device C and which spatial filters are used at device B for making the measurements, there are different variants of Method 1 as shown in FIG. 8.

Figure 9:
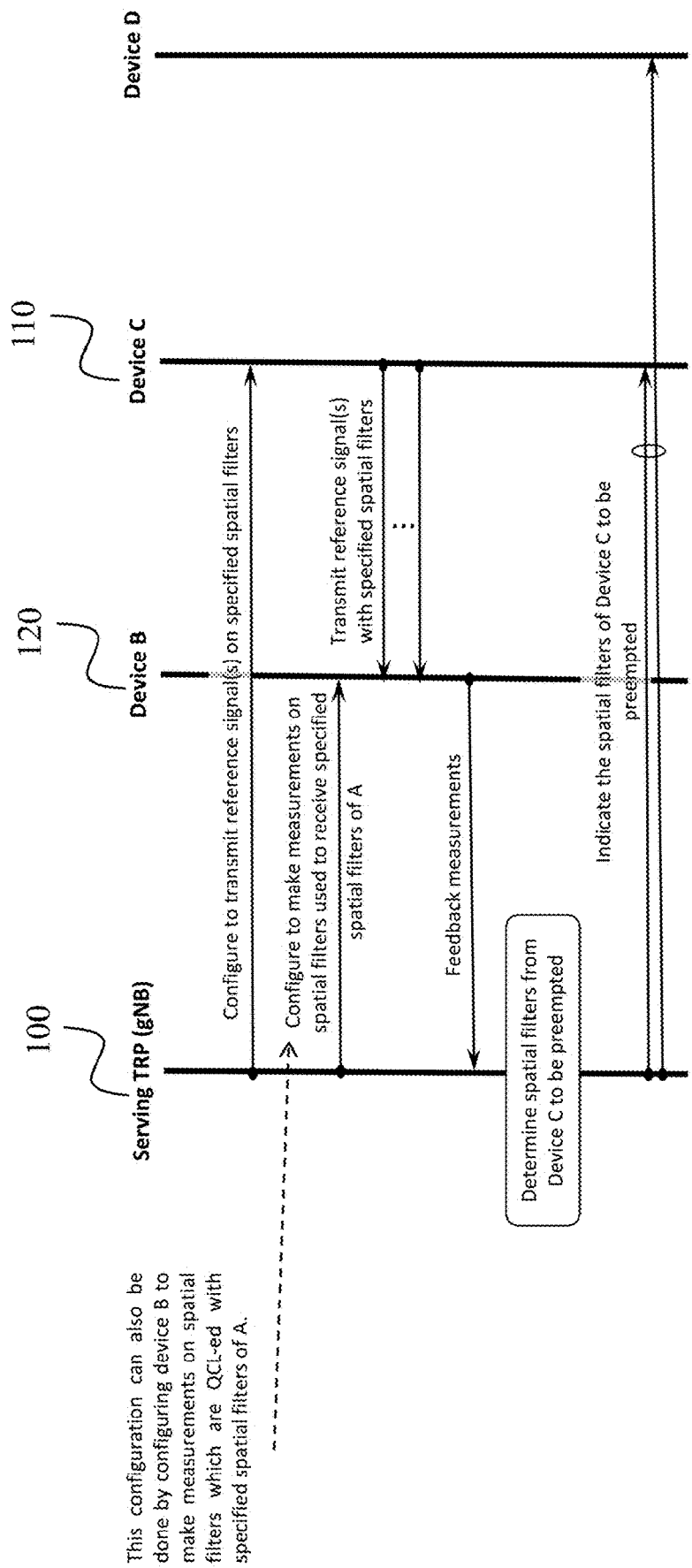
FIG. 9 shows a signaling chart of a method according to an embodiment of the present invention.

For example, in the variant Method 1*a*, device B sends a reference signal (sounding) with its available spatial filters, e.g. in all directions, and device C makes measurements with its available spatial filters, e.g. on all directions. However, determining the spatial filters to be preempted based on Method 1*a*, may lead to preempting spatial filters of device C which may not cause interference at device B, when it is receiving from device A, since the measurements are not done considering that the transmission in the low priority link and/or reception in the high priority link may be beamformed. Thus, Method 1*a* is conservative in terms of potential interference impact, as the spatial filters to be preempted may not cause interference. To obtain a more precise impact of the interference, the sounding of device C and the measurements at device B can be done with certain spatial filters. If device B is configured to make measurements with the spatial filters used to receive the high priority transmission, i.e. to receive the transmission from device A, then it leads to the variant Method 1*b* as shown in FIG. 8. If device C is configured to transmit reference signals with the spatial filters it uses to transmit the low priority transmission, i.e. for the transmission to device D, then it leads to the variant Method 1*c* as shown in FIG. 8. Method 1*b* and 1*c* provide a more precise determination of the potential interference impact compared to Method 1*a*. If device B is configured to make measurements with the spatial filters it uses for the reception of the transmission from Device A, and in addition, device C is configured to transmit reference signals with the spatial filters it uses to transmit to Device D, then it leads to the variant Method 1*d* as shown in FIG. 8. Method 1*d* provides a more precise determination of the potential interference impact compared to Method 1*a*, 1*b* and 1*c*. For the variants of Method 1, the spatial filters to be preempted are determined at the network based on the measurements, and afterwards the spatial filters to be preempted are signaled to the device C and device D. A signaling chart of Method 1*d* is depicted in FIG. 9.

Figure 10:
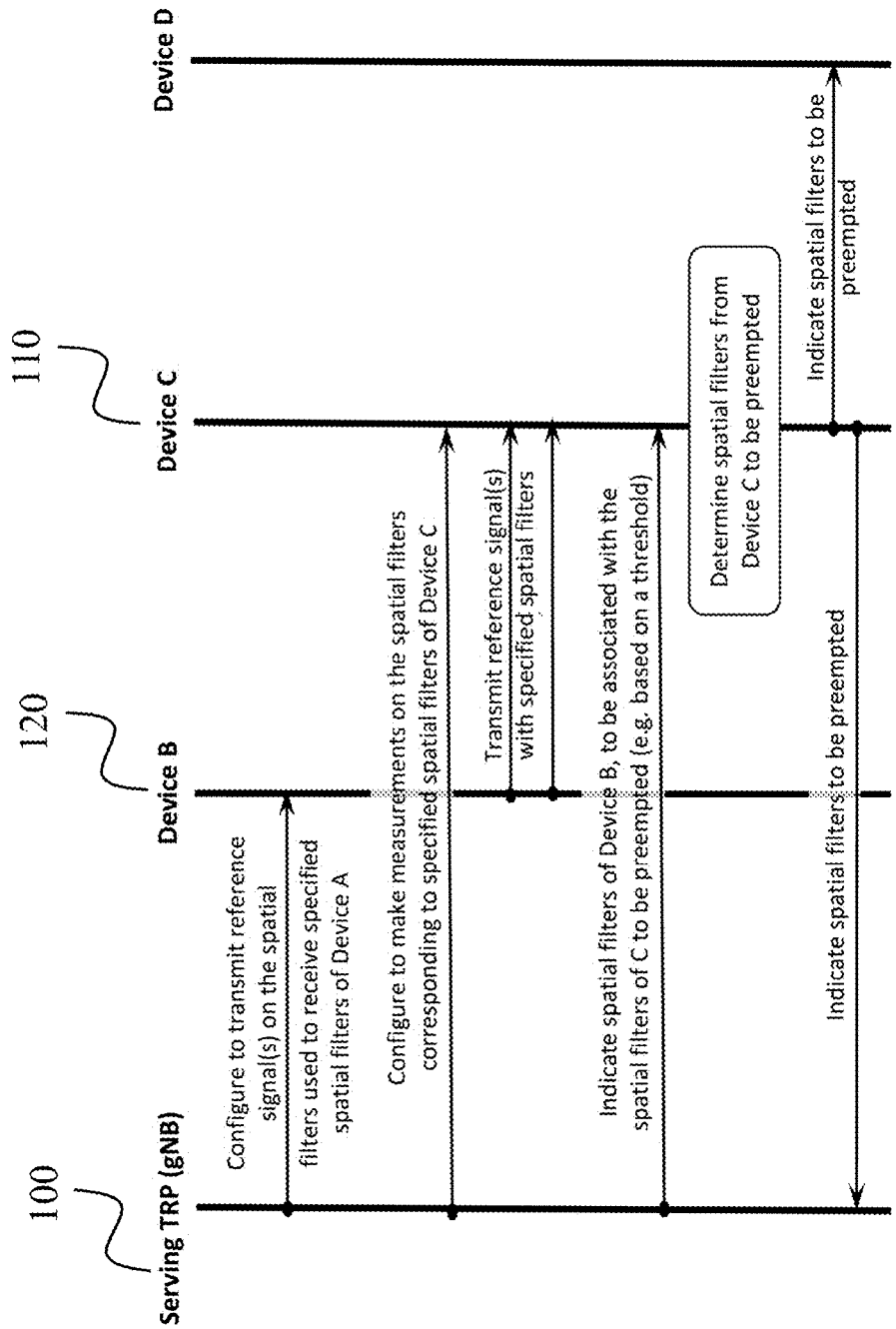
FIG. 10 shows a signaling chart of a method according to an embodiment of the present invention.
Figure 11:
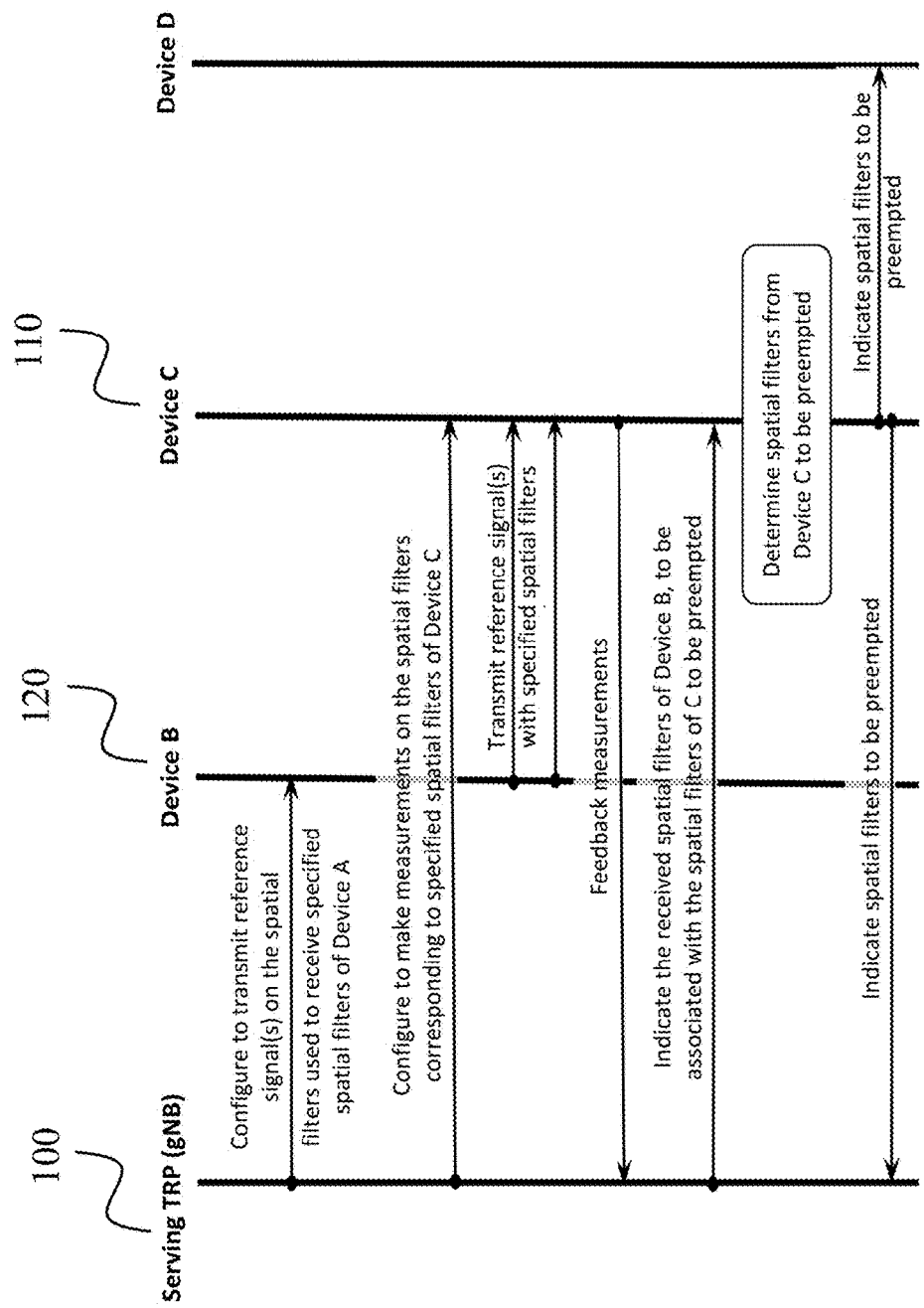
FIG. 11 shows a signaling chart of a method according to an embodiment of the present invention.

In a similar way, several variants of Method 2, with or without feedback, can be described. Depending on which spatial filters are used for sounding by device B and which spatial filters are used at device C for making the measurements, there are different variants of Method 2, some of which shown in FIG. 8. For example, in the variant Method 2*a*, device C sounds with its available spatial filters, e.g. in all directions, and device B makes measurements with its available spatial filters, e.g. on all directions. However, determining the spatial filters to be preempted at device C based on Method 2*a*, may lead to preempting spatial filters of device C which may not cause interference at device B, when it is receiving from device A, since the measurements are not done considering that the transmission in the low priority link and/or reception in the high priority link may be beamformed. Thus, Method 2*a* is conservative in terms of potential interference impact, as the spatial filters to be preempted may not cause interference. To obtain a more precise impact of the interference, the sounding of device B and the measurements at device C can be done with certain spatial filters. If device C is configured to make measurements with the receive spatial filters (receive beams), which correspond to the spatial filters (transmit beams) used for the low priority transmission, i.e. for the transmission to Device D, then it leads to the variant Method 2*b* as shown in FIG. 8. If device B is configured to transmit reference signals with the spatial filters it uses to receive the high priority transmission, i.e. to receive the transmission from Device A, then it leads to the variant Method 2*c* as shown in FIG. 8. Method 2*b* and 2*c* provide a more precise determination of the potential interference impact compared to Method 2*a*. If device C is configured to make measurements on the spatial filters which are used for the transmission to device D, and in addition, device B is configured to transmit reference signals with the spatial filters used to receive the transmission from Device A, then it leads to the variant Method 2*d* as shown in FIG. 8. A signaling chart of Method 2*d* without feedback is depicted in FIG. 10. A signaling chart of Method 2*d* with feedback is depicted in FIG. 11. Method 2*d* provides a more precise determination of the potential interference impact compared to Method 2*a*, 2*b*, 2*c*. For the variants of Method 2, the spatial filters to be preempted are determined at device C based on the measurements, and afterwards the spatial filters to be preempted are signalled to device D and to the network. The variants of Method 2 can also be performed with feedback as shown in FIG. 10, where in this case the network does not need to signal a threshold to device C.

Method 1*a* and Method 2*a*, according to embodiments of the invention, provide robustness to changes, e.g. mobility, and thus, may be more suitable for dynamic scenarios. Method 1*d* and Method 2*d*, according to other embodiments of the invention, are based on more accurate potential interference and may be more suitable for static scenarios.

Figure 12:
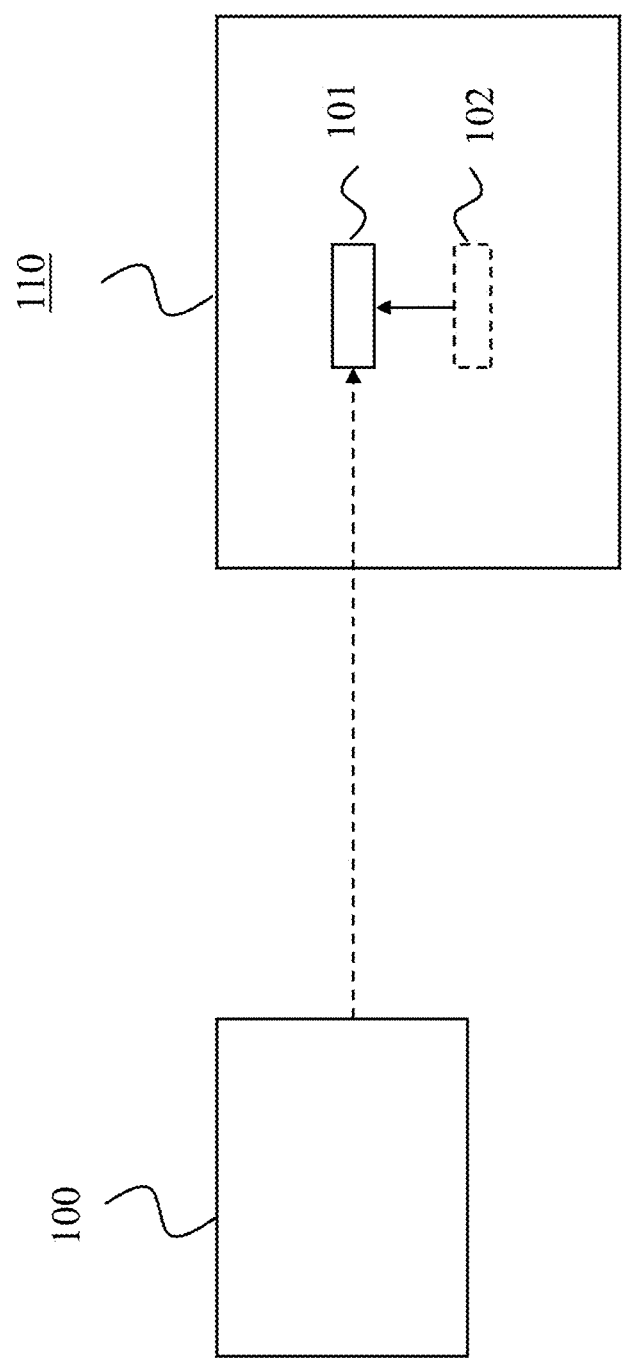
FIG. 12 shows a UE according to an embodiment of the present invention.

FIG. 12 shows a UE 110 according to an embodiment of the invention. In order to support preemption of a transmission over a link, the UE 110, may be configured to obtain preemption information 101 from a network device 100. In particular, the UE 110 in FIG. 12 is the same first UE 110 as shown in FIG. 1-11, and the network device 100 is the same network device 100 as shown in FIG. 1-11. Accordingly, the preemption information 101 is indicative of at least one first spatial filter 102 that is to be preempted by the UE 110 for the transmission over the first link.

Similar as in the embodiments shown in FIG. 1-11, the first link may be a low priority link. To mitigate an interference from the low priority link on the high priority link, the spatial filters used in the low priority link which may cause the interference to the receive device in the high priority link, should be preempted.

Accordingly, the UE 110 may be configured to preempt the at least one first spatial filter 102 when transmitting over the first link.

Optionally, the preemption information 101 may comprise at least one resource indicator of the UE 110, wherein each of the at least one resource indicator identifies a resource corresponding to each of the at least one first spatial filter 102 that is to be preempted. While the resource indicator identifies the resource corresponding to the spatial filter to be preempted, the resource indicator of the UE should be provided.

Optionally, in order to determine the spatial filter to be preempted, the UE 110 may be instructed to perform a sounding transmission, in particular, to transmit reference signals with some spatial filters. Thus, the UE 110 is configured to receive an indication from the network device 100, indicating to transmit a reference signal 111 on at least one first spatial filter. The UE 110 may be further configured to transmit the reference signal 111 on the at least one first spatial filter.

Alternatively, the UE 110 may be instruct to perform the measurement on reference signals from another UE. Optionally, the UE 110 may be configured to receive an indication from the network device 100 to perform a measurement of a reference signal 121 on at least one first spatial filter. And the UE may be further configured to receive the reference signal 121 from another UE 120, and perform the measurement accordingly.

For both alternatives, the at least one first spatial filter may be allocated by the UE 110 for transmitting over the first link. That means, the UE should transmit the reference signal or make the measurement, with the spatial filters used for the transmission of the low priority link.

Further, the preemption information 101 may indicate the UE 110 to preempt one or more of the at least one first spatial filter 102 based on the measurement of the reference signal 121 transmitted on at least one second spatial filter from the other UE 120.

Optionally, the UE 110 may be configured to receive information, indicative of the at least one second spatial filter used by the other UE 120 to transmit the reference signal 121, from the network device 100. After the spatial filters of the other UE 120, i.e. the at least one second spatial filter 103, which are to be associated with the spatial filters of the UE to be preempted, is determined, the network device 100 indicates these spatial filters of the other UE 120 to the UE 110.

Since the determination of the spatial filter to be preempted is performed at the UE side, the network device 100 may have no information regarding the spatial filters of the UE 110 to be preempted. Thus, after the UE 110 has determined the spatial filters to be preempted, it signals the network device 100. Optionally, the UE 110 may also signal a receiving UE of the first link, e.g. in the sidelink control information, the spatial filters which will be preempted. Thus, the UE 110 may be configured to indicate to the network device 100 and/or to a receiving UE of the first link, information indicative of the at least one first spatial filter 102 to be preempted.

Optionally, the preemption information 101, according to an embodiment of the invention, may further indicate at least one further spatial filter of the UE 110 for the transmission over the first link, and the UE is configured to: switch a transmission on the at least one first spatial filter 102 to be preempted to the at least one further spatial filter when transmitting over the first link. This is to instruct the UE 110, to use other spatial filters to transmit the low priority link, which does not cause any interference on the high priority link, instead of using the spatial filter which may cause the interference to the high priority link.

Figure 13:
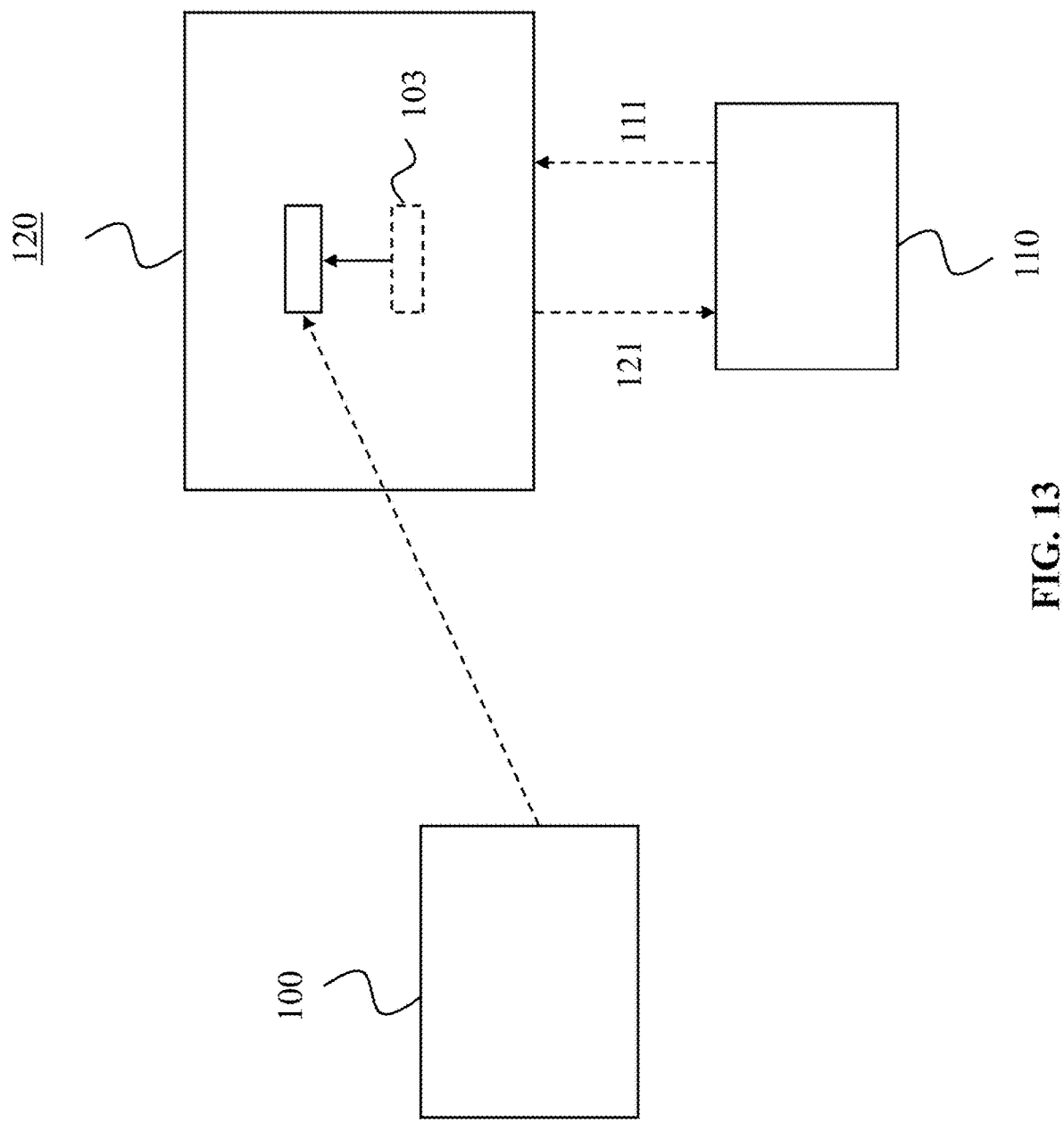
FIG. 13 shows another UE according to an embodiment of the present invention.

FIG. 13 shows a UE 120 according to an embodiment of the invention. The UE 120 as shown in FIG. 13, may be configured to receive an indication from a network device 100 to perform a measurement of a reference signal 111 on at least one second spatial filter 103, or transmit a reference signal 121 on at least one second spatial filter. Accordingly, the UE 120 may be configured to receive the reference signal 111 from another UE 110 and perform the measurement on the at least one second spatial filter. Or alternatively the UE 120 may be configured to transmit the reference signal 121 to another UE 110 on the at least one second spatial filter, according to the indication received from the network device 100. In particular, the at least one second spatial filter is allocated by the UE 120 for receiving over a second link.

The UE 120 shown in FIG. 13 is the same UE as the second UE 120 shown in FIG. 1-11. In particular, the other UE 110 in FIG. 13 is the first UE 110 as shown in FIG. 1-12, and the network device 100 is the same network device 100 as shown in FIG. 1-12.

Similar as in the embodiments shown in FIG. 1-11, the second link may be a high priority link. To mitigate an interference from a low priority link on the high priority link, the spatial filters used in the low priority link which may cause the interference to the receive device in the high priority link, need to be preempted.

In order to support preemption of a transmission over the first link, the UE 120 is instructed to perform a sounding transmission or a measurement, particularly on the resource (at least one second spatial filter) used for the reception of a high priority transmission.

If a spatial filter to be preempted is determined by the network device 100, the UE 120 should feedback the measurements to the network device 100. Optionally, the UE 120 is configured to send the measurement of the reference signal 111 to the network device 100.

FIG. 14 shows a method 1400 for supporting preemption of a transmission over a first link, according to an embodiment of the present invention. In particular, the method 1400 is performed by a network device 100 as shown in FIG. 1. The network device 100 is also the network device 100 as shown in FIG. 2-13. The method 1400 comprises: a step 1401 of providing preemption information 101 to a first UE 110, wherein the preemption information 101 is indicative of at least one first spatial filter 102 that is to be preempted by the first UE 110 for the transmission over the first link.

FIG. 15 shows a method 1500 supporting preemption of a transmission over a first link, according to an embodiment of the present invention. In particular, the method 1500 is performed by a UE 110 as shown in FIG. 12. The UE 110 is the first UE 110 as shown in FIG. 1-11. The method 1500 comprises a step 1501 of obtaining preemption information from a network device 100, wherein the preemption information 101 is indicative of at least one spatial filter 102 that is to be preempted by the UE 110 for the transmission over the first link.

Figure 16:
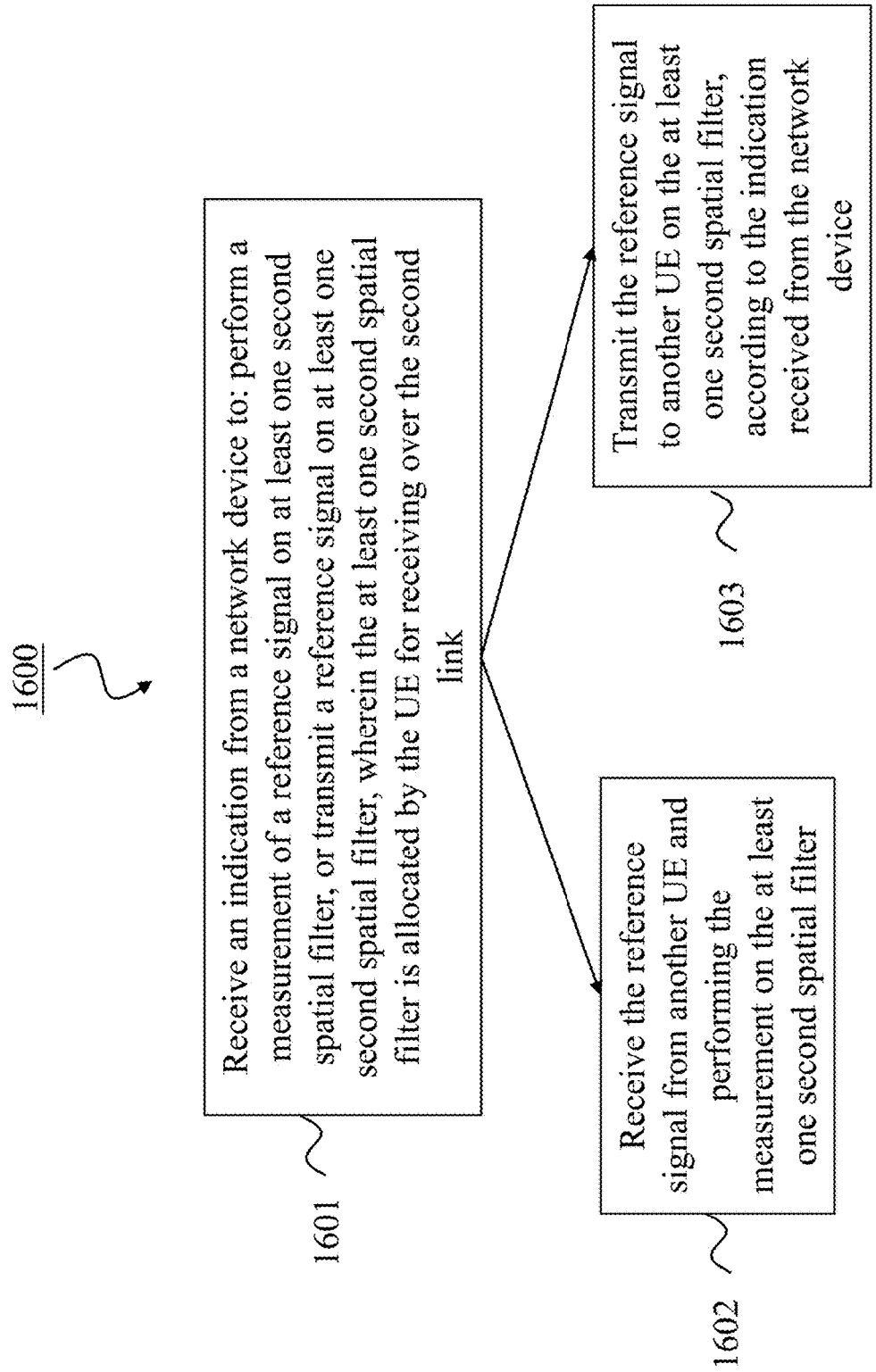
FIG. 16 shows a schematic block flowchart of another method for supporting preemption of a transmission over a low priority link according to an embodiment of the present invention.

FIG. 16 shows a method 1600 supporting preemption of a transmission over a first link, according to an embodiment of the present invention. In particular, the method 1600 is performed by a UE 120 as shown in FIG. 13. The UE 120 is also the second UE 120 as shown in FIG. 1-11. The method 1600 comprises a step 1601 of receiving an indication from a network device 100 to: perform a measurement of a reference signal 111 on at least one second spatial filter, or transmit a reference signal 121 on at least one second spatial filter; and a step 1602 of receiving the reference signal 111 from another UE 110 and performing the measurement on the at least one second spatial filter, or a step 1603 of transmitting the reference signal 121 to another UE 110 on the at least one second spatial filter, according to the indication received from the network device 100. In particular, the at least one second spatial filter is allocated by the UE 120 for receiving over a second link.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. User equipment (UE) for supporting preemption of a transmission over a first link for low priority transmissions in support of transmission over a second link for high priority transmissions, the UE comprising:
   a processor; and
   a memory coupled to the processor and storing processor-executable instructions that, upon execution by the processor, cause the UE to implement operations including:
      obtain preemption information from a network device for use in mitigating interference of transmission on the second link,
         wherein the preemption information indicates to the UE to preempt one or more spatial filters of at least one first spatial filter for transmission over the first link based on a measurement of a reference signal transmitted on at least one second spatial filter of another UE, and
         wherein preemption of the one or more spatial filters is either data preemption or a change of the spatial filters supporting the transmission;
      receive an indication from the network device to measure the reference signal on at least one of the at least one first spatial filter;
      receive the reference signal from the other UE over the second link of at least one second spatial filter; and
      measure the reference signal.

2. The UE according to claim 1, wherein the preemption information comprises at least one resource indicator of the UE, and wherein each of the at least one resource indicator identifies a resource associated with one of the at least one first spatial filter that is to be preempted.

3. The UE according to claim 1, wherein the at least one first spatial filter is allocated by the UE for transmitting over the first link.

4. The UE according to claim 1, wherein the operations further include receive information indicating the at least one second spatial filter used by the other UE to transmit the reference signal from the network device.

5. The UE according to claim 1, wherein the operations further include indicate to the network device or to a receiving UE of the first link, information indicative of the at least one first spatial filter to be preempted.

6. The UE according to claim 1, wherein the preemption information further indicates at least one further spatial filter of the UE, and the operations further include:
   switch a transmission on the at least one first spatial filter to be preempted to the at least one further spatial filter when transmitting over the first link.

7. User equipment (UE) for supporting preemption of a transmission over a first link for low priority transmissions in support of transmission over a second link for high priority transmissions, the UE comprising:
   a processor; and
   a memory coupled to the processor and storing processor-executable instructions which upon execution by the processor, cause the UE to implement operations including:
      receive an indication from a network device to measure a reference signal on at least one second spatial filter, or transmit the reference signal on at least one first spatial filter;
      receive the reference signal from another UE and measure the reference signal on the at least one second spatial filter, or transmit the reference signal to the other UE on the at least one second spatial filter, according to information provided by the indication received from the network device,
         wherein the at least one second spatial filter is allocated by the UE for receiving transmissions over the second link; and
      based on the UE measuring the reference signal, send the measurement to the network device for use in determining whether to preempt transmission on at least one first spatial filter for the transmission over the first link to mitigate interference of transmission on the second link,
         wherein preemption of transmission on the at least one first spatial filter is either data preemption or a change of a composition of the at least one first spatial filter.

8. The UE according to claim 7, wherein the preemption information further indicates at least one further spatial filter to be used by the UE for the transmission over the first link.

9. The UE according to claim 7, wherein the preemption information comprises at least one resource indicator of the UE, and wherein each of the at least one resource indicator identifies a resource associated with one of the at least one first spatial filter to be preempted.

10. The UE according to claim 9, further comprising determining the at least one resource indicator of the UE based on the measurement performed by the other UE.

11. A method for a network device for supporting preemption of a transmission over a first link for low priority transmissions in support of transmission over a second link for high priority transmissions, the method comprising:
    instructing, over the first link, a first user equipment (UE) to transmit a reference signal on at least one first spatial filter;
    instructing, over a second link, a second UE to measure the reference signal on at least one second spatial filter for transmission;
    determining preemption information based on the measuring by the second UE;

providing the preemption information to the first UE,
  wherein the preemption information indicates to the first UE to preempt one or more of the at least one first spatial filter for the transmission over the first link to mitigate interference of transmission on the second link, and
  wherein preemption of the one or more of the at least one first spatial filter is either data preemption or changing a composition of spatial filters comprising the at least one first spatial filter supporting the transmission.

12. The method according to claim 11, wherein the preemption information further indicates at least one further spatial filter to be used by the first UE for the transmission over the first link.

13. The method according to claim 11, wherein the preemption information comprises at least one resource indicator of the first UE, and wherein each of the at least one resource indicator identifies a resource associated with one of the at least one first spatial filter to be preempted.

14. The method according to claim 13, further comprising determining the at least one resource indicator of the first UE based on the measurement performed by the second UE.

* * * * *